Feb. 14, 1956  C. L. DAY ET AL  2,734,672
CONTAINER SEALING APPARATUS
Filed June 23, 1952  11 Sheets-Sheet 4

INVENTORS:
Carl L. Day,
Frederick E. Fauth,
BY
ATTORNEYS.

Feb. 14, 1956  C. L. DAY ET AL  2,734,672
CONTAINER SEALING APPARATUS
Filed June 23, 1952  11 Sheets-Sheet 11

INVENTORS:
Carl L. Day,
Frederick E. Fauth,
BY
ATTORNEYS.

United States Patent Office 2,734,672
Patented Feb. 14, 1956

2,734,672

CONTAINER SEALING APPARATUS

Carl L. Day and Frederick E. Fauth, Baltimore, Md., assignors to Crown Cork & Seal Company, Inc., Baltimore, Md., a corporation of New York Application June 23, 1952, Serial No. 295,024

28 Claims. (Cl. 226—88)

The present invention relates to container sealing apparatus and, more particularly, to apparatus for applying and securing threaded type caps upon containers. However, a number of the mechanisms hereinafter described are useful for the handling of caps of non-threaded type.

Numerous machines heretofore have been proposed for the securing of threaded caps to containers, but such prior machines have not been of optimum efficiency in the handling of containers moving at high speed. In addition, the prior machines have not been capable of ready adjustment for the handling of containers and caps of a wide range of sizes.

An object of the present invention is to provide a machine for securing threaded type caps to containers, the apparatus being of such design that a cap loosely positioned at random upon the mouth of a container readily will be firmly secured upon the container to thereby close and seal the latter.

A particular difficulty heretofore encountered in the securing of threaded type caps upon containers has been due to the fact that a threaded cap initially placed upon the threaded mouth of a container may lie at almost any angle with respect to the container mouth. That is, the point at which the cap threads and container threads initially and loosely contact primarily will determine how the cap initially will lie on the mouth container. Prior mechanisms have not been capable of coping with all possible variations in position, especially under high speed operation. The present invention includes relatively simple mechanism capable of firmly securing a loosely positioned threaded-type cap upon a container and without retarding movement of the container.

Another object of the invention is to provide an apparatus of the type described above which is readily adjustable to handle various sizes of caps and containers.

Most packing plants find it necessary at frequent intervals to change the size of the containers or caps being handled. It heretofore has been proposed to make the cap chutes and cap applying means of container sealing apparatus adjustable for various sizes of caps. However, such adjustments have been difficult to make, particularly where the plant operates according to seasonal requirements and much of the labor employed is relatively unskilled.

We have found that the most satisfactory manner of adjusting a capping machine for various sizes of caps is to include with the machine equipment a number of cap applying mechanisms of like type, each one being designed to handle a different size cap but all of which readily can be mounted upon the machine frame for cooperation with an adjustable capping chute.

Another object of the invention is to provide a cap chute and cap applying mechanism which are so related that the cap applying mechanism readily can be replaced by a similar device and the chute adjusted when caps of another size are to be handled.

Other objects and advantages of the invention will be apparent from the following specification and accompanying drawings.

Figure 2 omits the steam tunnel structure shown at the upper left-hand portion of Figure 1.

General description

Figure 1:
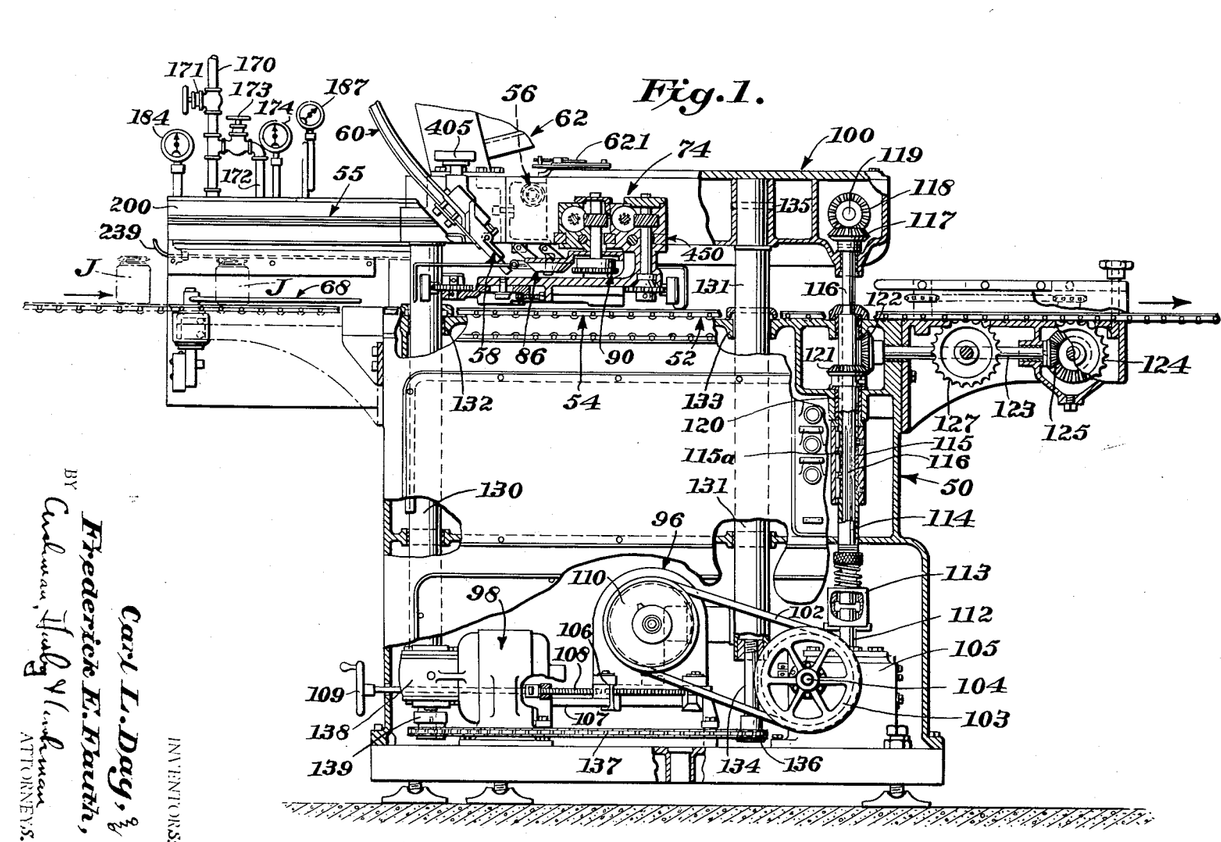
Figure 1 is a view partly in front elevation and partly in vertical section of a machine constructed in accordance with the invention, the view omitting most of the upper portion of the machine so that only the extreme lower portions of the cap chute and hopper are shown.
Figure 2:
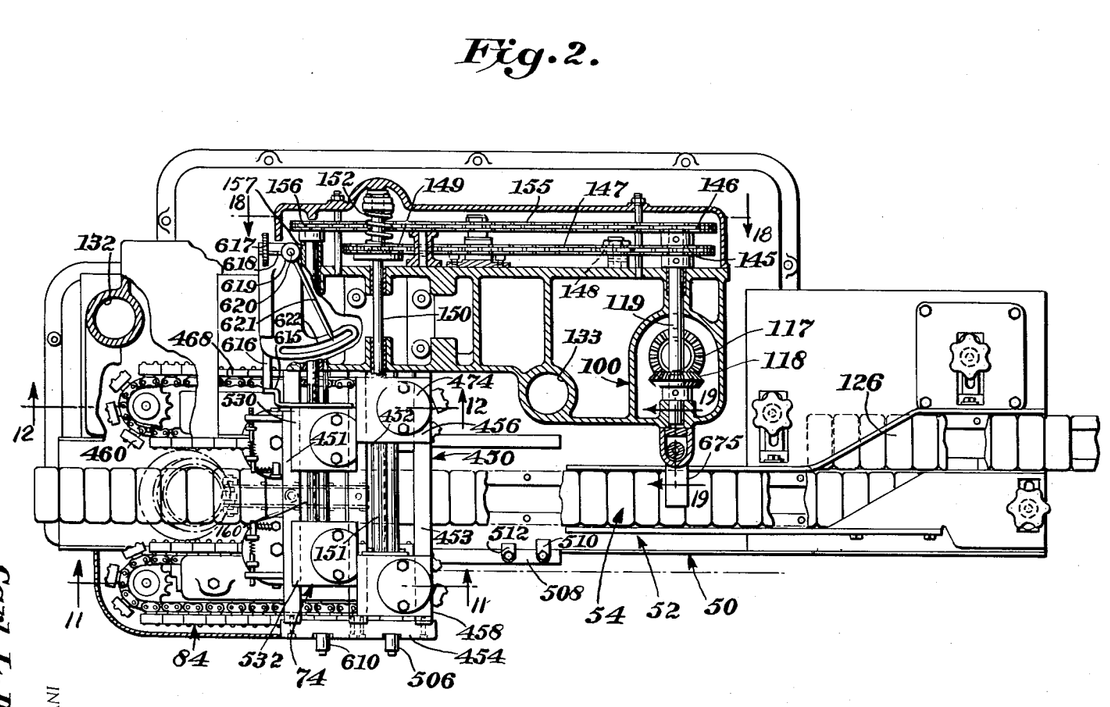
Figure 2 is a plan view of the structure shown in Figure 1 but with some portions in horizontal section.

The construction and operation of the machine illustrated in the application as embodying the invention generally may be described as follows: Referring to Figures 1 and 2, the machine includes a base casing or housing 50 including an upper surface or work table 52 across which the top run of a straight line conveyor 54 moves filled jars J or other containers from left to right in Figures 1 and 2. The containers J first will move through a steam tunnel 55 so that at least a substantial portion of the air within the headspace of the container will be displaced by steam. If desired, an inert gas, steam and heated air, or steam, alone, may be flowed into the headspace of the containers during movement through tunnel 55. Whatever fluid is used may be delivered to tunnel 55 and to a diffuser 56 adjacent the tunnel exit through suitable piping.

Figure 7:
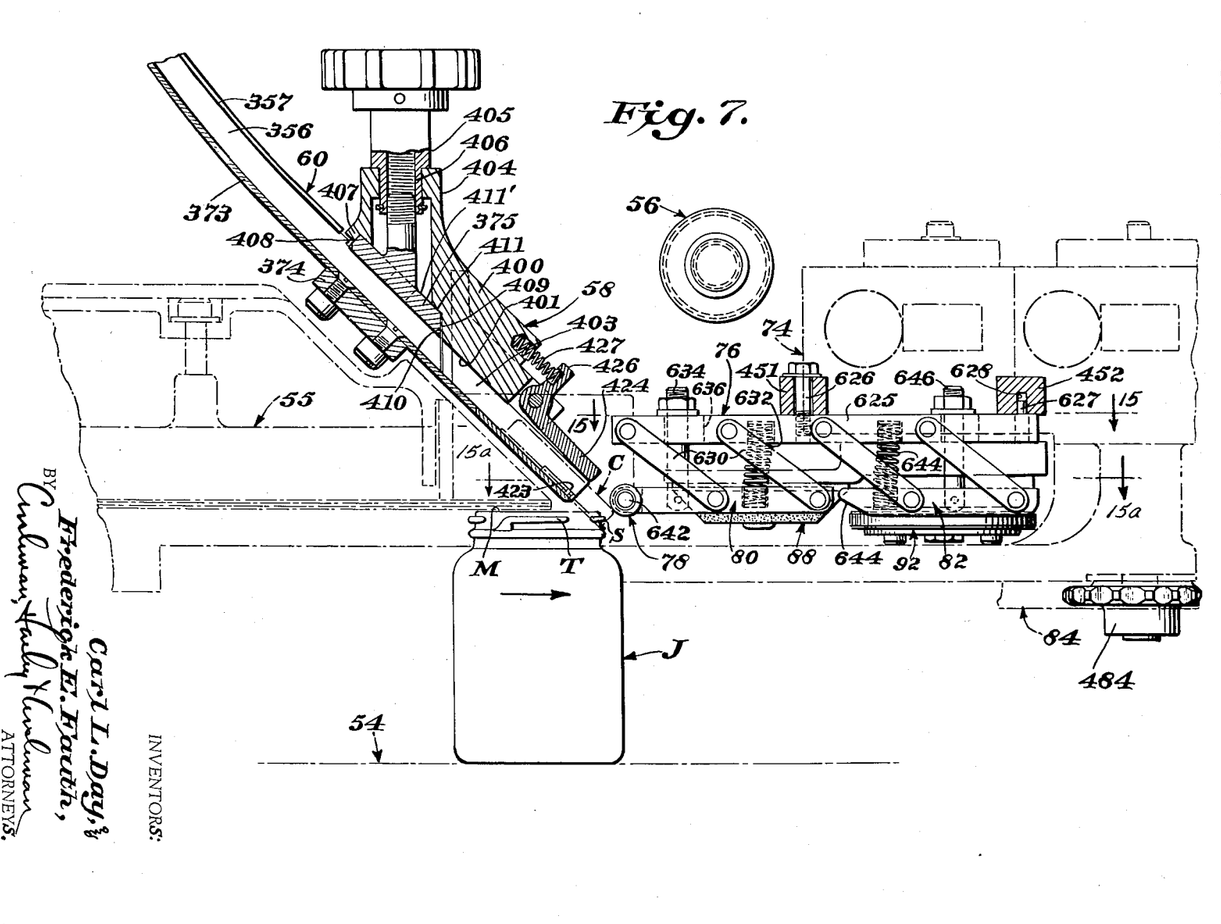
Figure 7 is a vertical sectional view through the cap applying and securing devices. The view shows the cap applying element in central vertical section and shows the cap securing means on the line 7—7 of Figure 9.

As is generally indicated in Figures 1 and 7, immediately after a container J leaves the steam tunnel 55, a cap C provided with thread engaging lugs L will be loosely applied to the container by a cap applying element 58 positioned above conveyor 54 and at the lower end of a cap chute 60.

Figure 3:
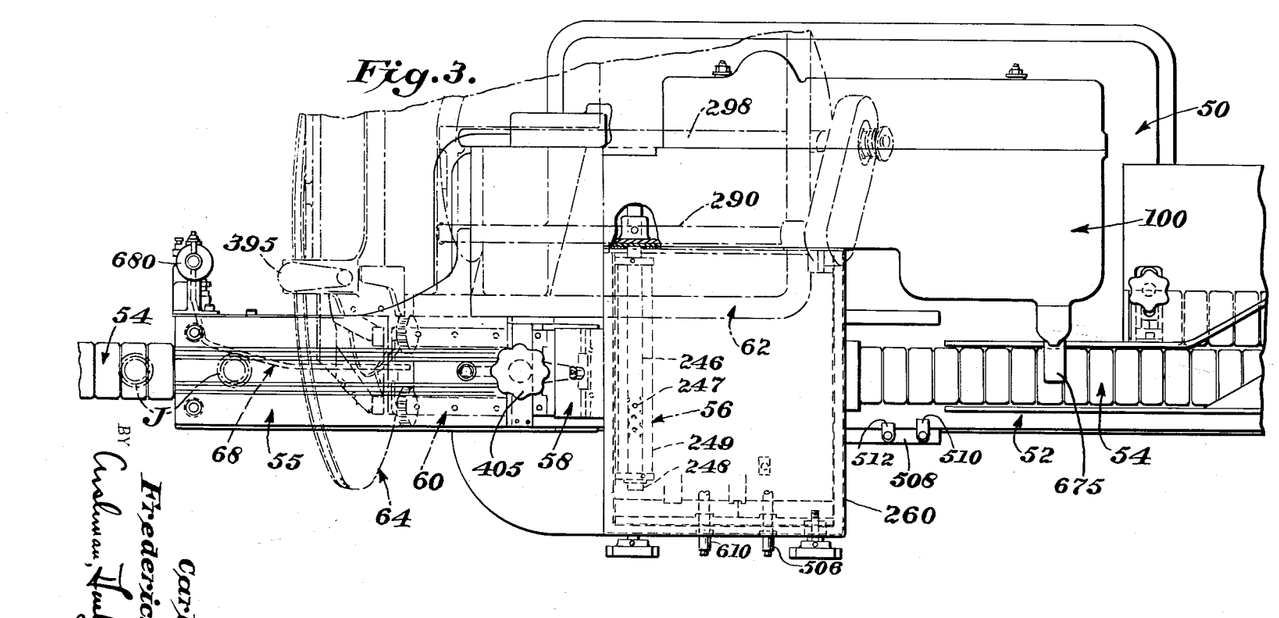
Figure 3 is a plan view of the structure shown in Figure 1, the view including dot-and-dash line showings of some upper portions of the structure omitted from Figure 1.

The caps to be applied to the containers are delivered to the chute 60 from a cap hopper 62 supported above the remainder of the machine as generally indicated in Figure 3. Hopper 62 is provided at one end with a cap feeding disc 64 including magnetic inserts which cause caps to adhere to the planar face of the disc. Disc 64 is rotatable about a substantially horizontal axis to move caps upwardly in a counter-clockwise direction. Disc 64 is driven by a suitable motor which is so controlled by a container-actuated switch operating arm 68 within steam tunnel 55 (Figure 1) that cap feeding disc 64 only will be driven when containers are moving through the tunnel.

Figure 8:
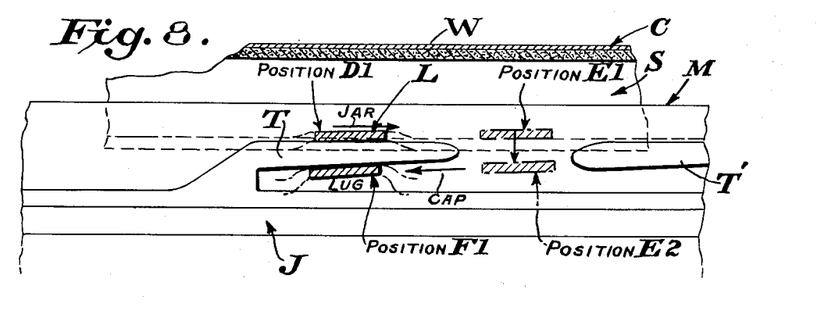
Figure 8 is a greatly enlarged and fragmentary view of a lug-type cap and the mouth of a container provided with a thread of interrupted type, the view diagrammatically indicating how the securing mechanism of the present invention positions the lug of a cap skirt in engagement with the thread of a container.

The detailed operation of the cap securing mechanism is hereinafter described under the heading "Cap securing mechanism—Operation" but the following brief description of how the machine operates to handle a cap loosely applied in one typical position will be helpful in connection with the present general description: Figure 8 is an enlarged fragmental showing of the mouth of a jar J provided with short threads T, the view also showing a cap C having inwardly projecting thread engaging lugs L on its skirt S. Assume that the cap C has been loosely applied to the container J by cap applying element 58 in such position that the lugs L of the cap are directly above and resting on the short and circumferentially spaced threads T of the container as shown at position D1 of Figure 8. Then the container and cap will move beneath the cap securing mechanism 74 shown in Figures 7, 9 and 10 and which includes a cap presser 76 provided with a horizontally and transversely disposed roller 78 at its infeed end and two horizontal and tandem arranged spring-loaded bars 80 and 82. Roller 78 so cooperates with the cap C as to cause bar 80 to smartly tap or impact the cap to urge it downwardly with respect to the container as hereinafter described. Then the bars 80 and 82 exert downward pressure upon the cap as it moves along with the container J. During the movement of a container J beneath the cap applying element 58 as well as during its travel through the securing mechanism 74, the body of container J will be engaged and held against rotation by horizontally arranged and opposed endless belts 84 illustrated in Figure 2 and also indicated in Figure 11 and other figures.

Figure 9:
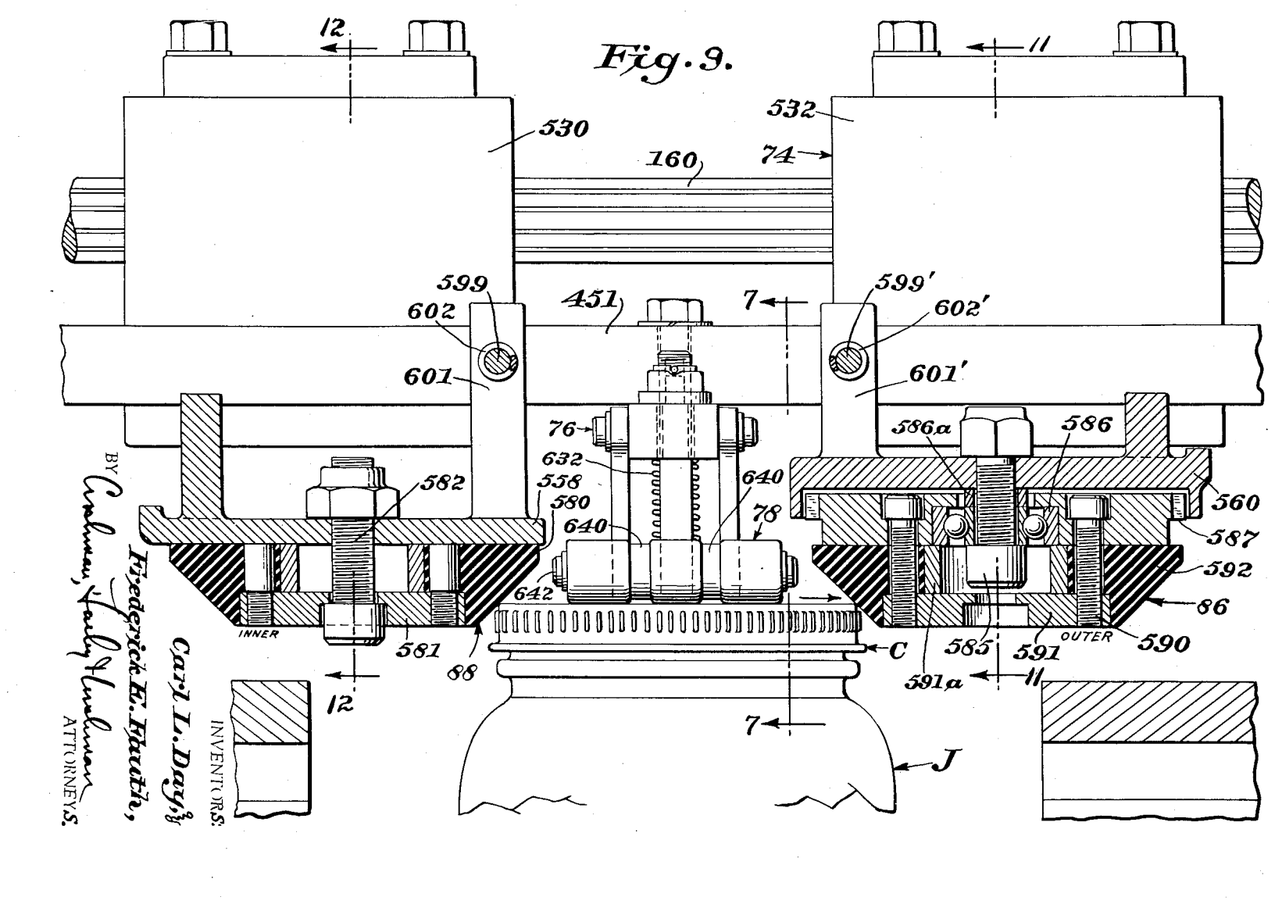
Figure 9 is a transverse vertical section through the cap securing means, the view showing the cap presser as viewed from the arrow 9a of Figure 15 and showing the cap unthreading members in vertical section on the line 9—9 of Figure 15.
Figure 15:
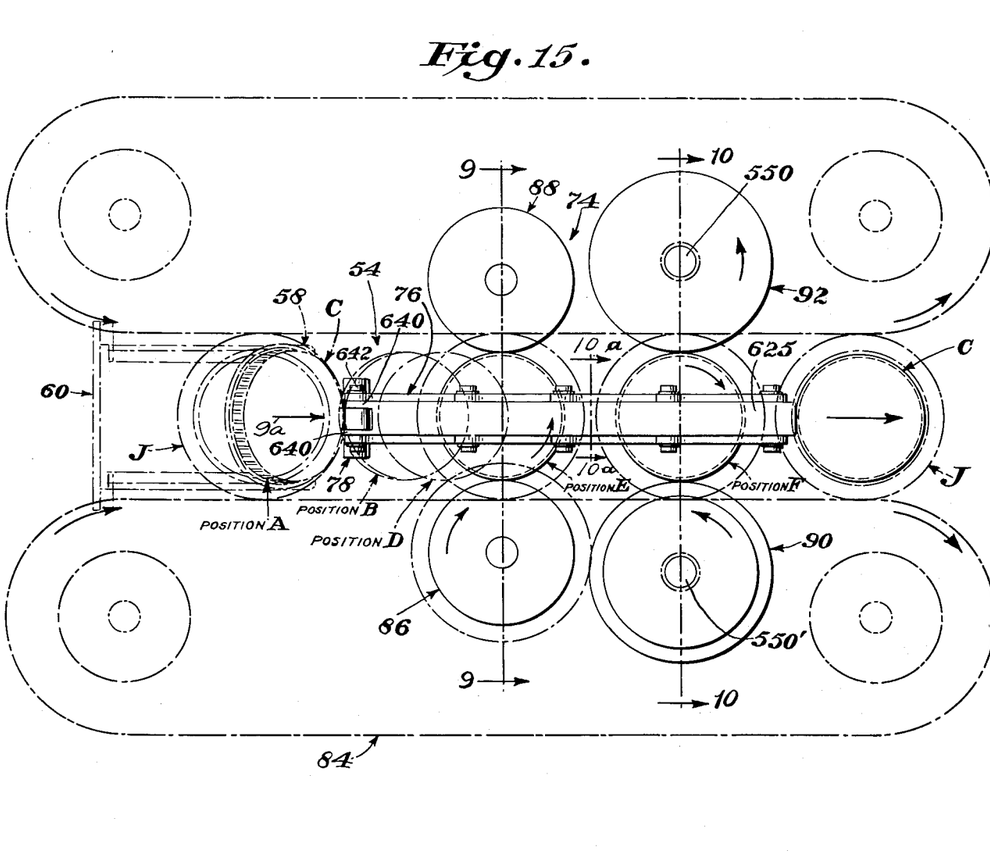
Figure 15 is a diagrammatic, horizontal section through the cap securing mechanism to illustrate the operation thereof in applying and securing a cap to a container. To assist in understanding the view, it generally may be described as showing the cap presser as viewed on the line 15—15 of Figure 7 and the unthreading members and threading rolls as viewed on the line 15a—15a of Figure 7.

The cap securing mechanism 74 also includes a pair of unthreading members 86 and 88 between which the container-carried cap will move as indicated in diagrammatic plan in Figure 15 and shown in transverse section in Figure 9. The member 88 is held against rotation but the roll 86 is driven in such direction (Figure 15) that as a loosely applied cap C moves past and contacts therewith, the cap will be rotated in a non-threading direction as indicated at position E in Figure 15. As is subsequently described in detail, this rotation of the cap will carry the cap lugs L from the Figure 8 position D1 to position E1 of the same figure, that is, with the cap lugs L clear of the container threads T. Then the pressure exerted by the presser bar 80 will force the cap downwardly with respect to the lip M of the container to bring the cap lugs L to position E2 of Figure 8 wherein a lug L is shown below but forwardly of a container thread T. This downward movement of the cap C will cause it to drop out of engagement with the tapered unthreading members 86 and 88. The continued forward movement of the container and cap with conveyor 54 immediately will bring the cap to position F of Figure 15, that is, between the opposed threading rolls 90 and 92 which are so driven that they will cause the cap to be rotated in a threading direction with respect to the container to thereby cause each cap lug L to move beneath a thread T of the container mouth as shown at position F1 of Figure 8 to thereby secure the cap upon the container. The threading rolls 90 and 92 are shown in transverse section in Figure 10 and include clutch means to disconnect them from their drive when a cap C is firmly threaded upon the container.

If the container headspace and cap have been filled with steam in tunnel 55, the steam will cool and condense at least shortly after the container leaves the securing mechanism 74. Hence, a low pressure condition will exist in the container. If an inert gas is flowed into the container, such gas will be sealed therein by the securing and sealing of the cap on the container.

The driven rolls 86, 90, and 92 of the cap securing mechanism 74 are driven from motor 96 shown in Figure 1 and the superstructure 100 carrying the hopper 62, chute 60, cap applying element 58, and cap securing mechanisms 74 may be raised and lowered to accommodate runs of containers of various heights by a drive from a motor 98 also shown in Figure 1. As is hereinafter described, all of the container and cap engaging and handling elements of the machine are readily adjustable to handle various sizes of containers and caps.

The foregoing mechanisms and operations are hereinafter discussed in detail under appropriate headings.

Driving elements

The motor 96 which drives the container suporting conveyor 54 and the driven devices of the cap securing mechanism is shown in Figure 1 as mounted in the lower central portion of the casing 50. Motor 96 drives a belt 102 which extends about a pulley 103 fixed to a horizontally extending shaft 104 extending into a gear reduction unit 105. Motor 96 is fixed to a base plate 106 which is slidable along a trackway 107 by means of a screw shaft 108 having a hand-wheel 109 fixed thereto exteriorly of casing 50. The driving pulley 110 of motor 96 is of the Reeves type and, hence, by the above arrangement, the speed at which pulley 103 and shaft 104 is driven may be varied.

The speed reduction unit 105 includes a vertically extending driven stub shaft 112 connected by an overload release 113 to a tubular shaft 114. A coupling 115 fixed to the exterior of the upper end of shaft 114 has a collar or hub 115a keyed to its interior and above the end of shaft 114. Hub 115a is provided on its interior with splines to engage an inner and splined shaft 116 which extends upwardly through the work table 52 and into superstructure 100. Within superstructure 100, shaft 116 carries a bevel gear 117 which meshes with a second bevel gear 118 and a horizontal shaft 119 journalled within the superstructure 100 as best shown in Figure 2. The manner in which the horizontally extending shaft 119 drives the various devices of the cap securing mechanism 74 is hereinafter explained.

Referring again to Figure 1, above hub 115a, coupling 115 is fixedly connected to a tubular shaft 120 which surrounds but is free of the splined shaft 116. Hence, shaft 120 will be driven by shaft 114 through coupling 115. Shaft 120 has a bevel gear 121 fixed thereto below work table 52, gear 121 engaging a second bevel gear 122 fixed to a horizontal shaft 123 which extends laterally to the right in Figure 1 to drive the sprocket 124 of conveyor chain 54 through the bevel gearing generally indicated at 125. As is indicated in Figure 2, the container supporting conveyor 54 extends across the work table 52 of the machine and because this conveyor is driven by motor 96 which also drives the cap securing mechanism 74, that mechanism will be driven in properly timed relation with conveyor 54.

After containers have moved through the machine, they may be directed laterally upon an outfeed conveyor 126 (Figure 2) movable about an idler sprocket 127 illustrated in Figure 1, conveyor 126 usually being driven from another source of power but at substantially the same speed as conveyor 54.

As best indicated in Figures 1 and 2, the superstructure 100 of the machine is fixed to the upper ends of vertically extending posts 130 and 131 guided in sockets 132 and 133, respectively, provided in work table 52 rearwardly of conveyor 54. At their lower ends, the posts 130 and 131 respectively threadedly engage vertically extending screw shafts, only the screw shaft 134 for post 131 being illustrated. As is indicated with respect to the post 131, the posts 130 and 131 are held against rotation by being pinned to the superstructure by pins such as 135. Screw shaft 134 will be rotatable and held against vertical movement so that rotation thereof simultaneously with the other screw shaft engaging post 130 will cause the two posts and superstructure 100 to rise or lower. The screw shaft 134 has a pulley 136 fixed to its lower end and a similar pulley is fixed to the other screw shaft, the two pulleys being engaged by a sprocket chain 137 driven by the reversible motor 98 through a speed reduction mechanism 138. An overload release clutch 139 may be provided in the output shaft of the unit 138.

It will be obvious that rotation of motor 98 in one direction will cause superstructure 100 to rise, while rotation of the motor in the opposite direction will lower the superstructure. The fact that shaft 116 has splines of substantial length engaged by collar 115a will permit the cap securing mechanism 74 to be driven from motor 96 over the entire range of vertical movement of superstructure 100. A suitable stop may be secured to post 130 or 131 to engage casing 50 to limit vertical travel of superstructure 100 to a desired range.

Figure 18:
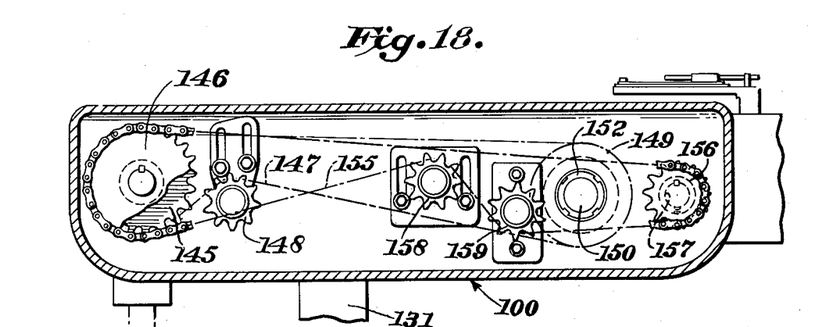
Figure 18 is a vertical sectional view on the line 18—18 of Figure 2.

Referring now to Figures 2 and 18, shaft 119 has two pulleys 145 and 146 fixed to its rear end, pulley 145 being of slightly smaller diameter than pulley 146. A sprocket chain 147 extends about the pulley 145 and, as shown in Figure 18, the lower run of chain 147 extends over an adjustable take-up idler 148 and then about a pulley 149 mounted on a horizontal shaft 150 which extends forwardly in superstructure 100 to the cap securing mechanism 74 to drive the container engaging belts 84 as hereinafter described. The forward portion of shaft 150 is splined as indicated at 151 in Figure 2 to enable the belts 84 to be moved with respect to each other without disconnecting them from driving relationship with shaft 150. Pulley 149 is connected to shaft 150 by an overload release clutch 152.

The other pulley 146 on shaft 119 has a sprocket chain 155 engaged therewith, chain 155 also engaging a pulley 156 fixed to a horizontal forwardly extending shaft 157. As best shown in Figure 18, sprocket chain 155 passes about opposite portions of two idler sprockets 158 and 159, at least sprocket 158 being adjustable for take-up purposes.

The forward portion of shaft 157 is splined as indicated at 160 in Figure 2 and is connected as hereinafter described to the cap threading rolls 90 and 92 and the cap unthreading roll 86 to thereby drive those rolls at the desired speed. Because of the difference in diameters of the sprockets illustrated in Figure 18, shaft 157 will be driven at a speed approximately twice as fast as that of shaft 150.

*The cap securing mechanism*

The cap securing mechanism 74 is illustrated in plan on a greatly reduced scale in Figure 2 and various sections thereof are illustrated on a larger scale in Figures 9 to 12. As is best shown in Figure 2, the cap securing mechanism is supported on a horizontal frame generally designated 450 and consisting of three bars 451, 452, and 453 secured at their inner ends to the superstructure 100 and joined at their outer ends by horizontal bars 454 which extend parallel to the container supporting conveyor 54. It will be observed from Figure 2 that the frame 450 overlies the conveyor 54.

Figure 11:
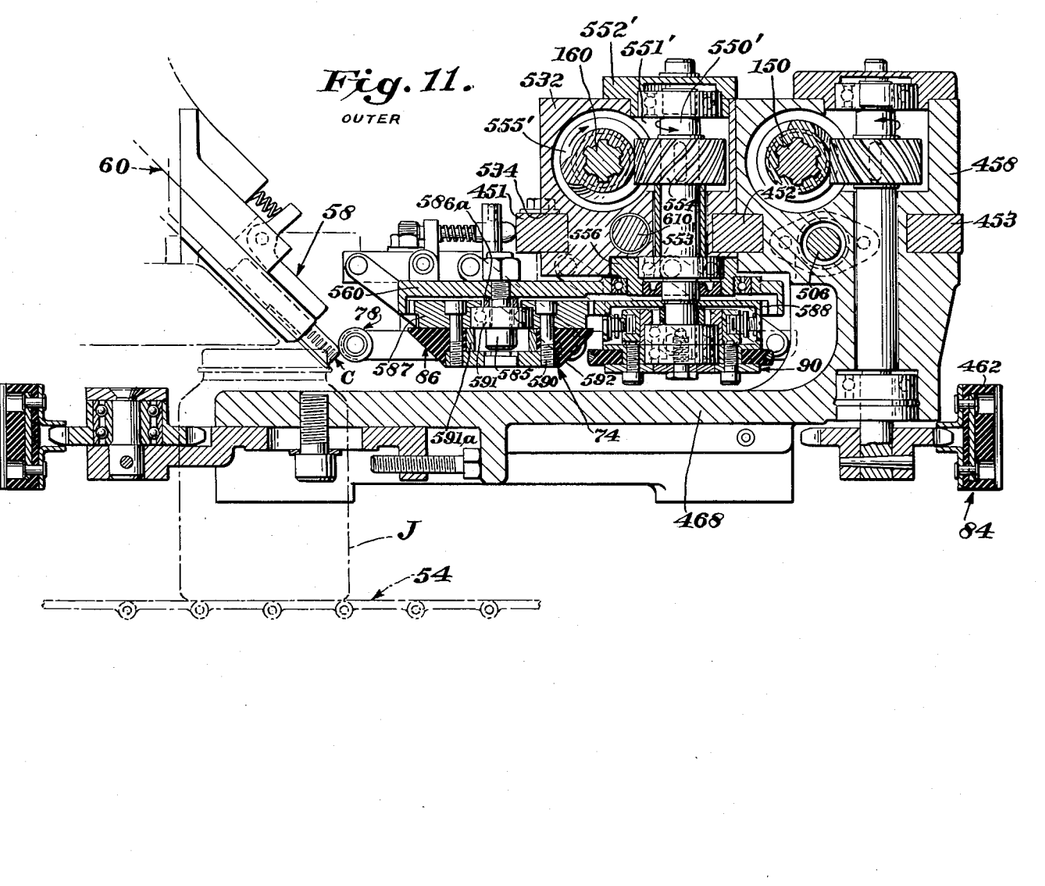
Figure 11 is a longitudinal vertical section of the cap securing mechanism, the view being generally taken on the line 11—11 of Figure 2 but showing the front or outer unthreading members and threading rolls in axial section.
Figures 12, 13:
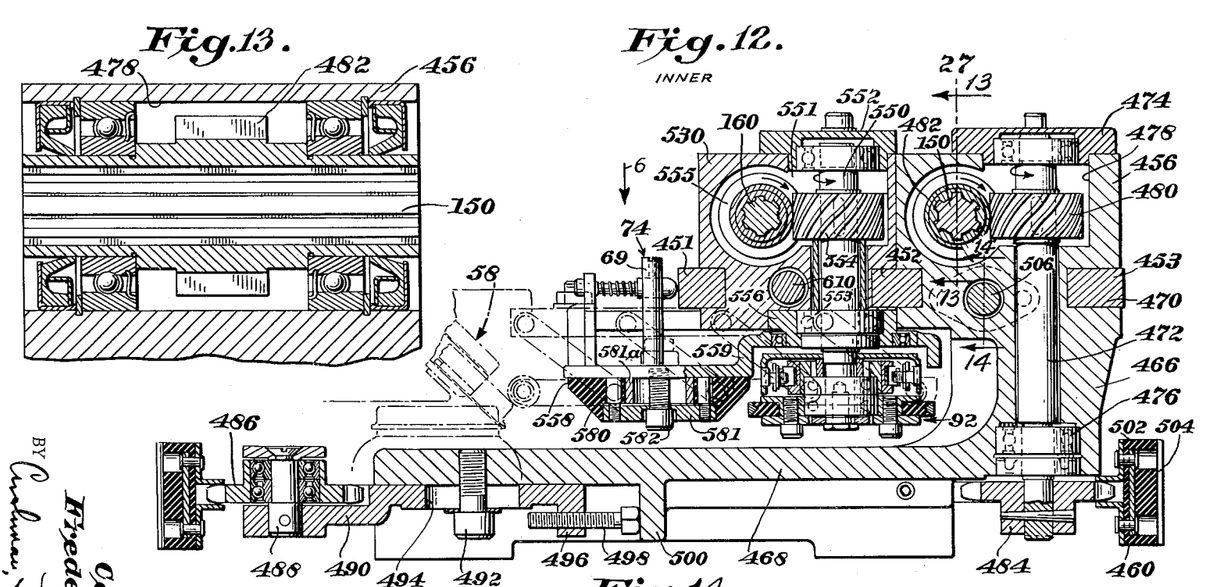
Figure 12 is a lonigtudinal vertical section of the cap securing mechanism, the view generally being taken on the line 12—12 of Figure 2 but showing the greater portion of the inner or rear unthreading members and threading rolls in axial section. The view also shows portions of the cap presser in dotted lines.
Figure 13 is a detail transverse vertical section on the line 13—13 of Figure 12.

Referring first to the arrangement for driving the container gripping endless belts 84, as best shown in Figure 2, the horizontal shaft 150 described above in connection with the driving mechanism of the machine has its splined outer portion extending parallel with and between the cross-bars 452 and 453. The bars 452 and 453 support castings 456 and 458 respectively shown in Figures 11 and 12. The casting 456 is associated with the innermost container gripping chain 460 as illustrated in Figure 12, while the casting 458 illustrated in Figure 11 is associated with the outer chain 462. The chains 460 and 462 comprise the container gripping element 84. The two castings are substantially identical so that a description of the casting 456 is sufficient for present purposes. Referring to Figure 12, it will be observed that casting 456 generally consists of a box-like upper portion 464, a depending substantially tubular portion 466 and a horizontally extending plate-like portion 468. The box-like portion 464 is provided with a groove 470 to embrace the cross-bar 453, and a similar groove in its opposite face partially embraces cross-bar 452. The tubular portion 466 serves to space the plate portion 468 in a plane below the cap unthreading and threading members and to form a guide for the runs of the endless chain. Casing 456 has a vertical shaft 472 journalled therein, the upper end of the shaft being journalled in a circular cap plate 474 and the lower portion of the shaft being journalled in bearings generally designated 476. Within a chamber 478 closed by a cap 474, shaft 472 carries a spiral gear 480 which meshes with a complementary gear 482 also mounted in the chamber 478 and splined to the shaft 150. The spline connection of gear 482 to shaft 150 permits the housing 464 to move in the frame 450 without disturbing the driving connection between shaft 150 and the vertical shaft 472.

At its lower end, shaft 472 has a sprocket 484 pinned thereto. Another sprocket 486 is supported at the infeed end of plate 468, sprocket 486 being journalled on a pin 488 mounted in a bracket 490 fixed to the underside of plate 468 by means of a machine screw 492 which extends through a longitudinally extending slot 494 in bracket 490. A depending flange 496 on bracket 490 has a horizontally extending set screw 498 threaded therein, the head of the set screw being adapted to bear on a flange 500 which depends from the central portion of plate 468. As is indicated in Figure 2, the chain 460 moves about the sprockets 484 and 486. In order that the chain will firmly grip the body portion of each container J moving with the conveyor 54, the links of the chain are provided with resilient but relatively rigid outwardly facing blocks 502 provided with vertically extending ribs 504. It will be understood that the chains 460 and 462 are driven at the same linear speed as the container supporting conveyor 54.

Figure 14:
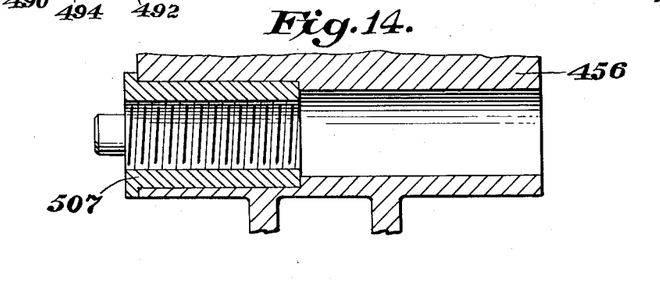
Figure 14 is a detail transverse vertical section of the line 14—14 of Figure 12.

In order to simultaneously adjust the belts 460 and 458 with respect to each other and the center line of the conveyor 54, a threaded rod 506 is journalled in the frame 450 parallel to the shaft 150. The shaft 506 threadedly engages nut elements 507 (Figure 14) secured in the housings 456 and 458, the portions of the shaft which engage the respective nut elements being reversely threaded so that the two housings and the plate portions 468 secured thereto will simultaneously move either toward or away from the conveyor center line. As is indicated in Figure 2, the plate portion 468 of housing 458 includes a bar 508 which extends toward the outfeed end of the conveyor 54. Adjacent its free end, bar 508 has two gauges 510 and 512 pivotally mounted on its upper surface so that the gauges thereby lie in the plane of the belt 462. The gauge 510 will be used for containers provided with two diametrically opposite flat walls while the gauge 512 will be used for round bodied containers. In more detail, if a container including two flat walls is to be handled, such a container will be centered on conveyor 54 opposite gauge 510 and while the conveyor is stationary. Then an operating handle may be placed upon the screw rod 506 and the rod rotated to bring the inner end of the gauge into contact with one flat wall of the container. If a round container is to be handled, such a container may be positioned opposite the gauge 512 and the screw shaft 506 operated to bring the gauge in contact with the container. When round containers are to be handled, it is desirable to have the belts 460 and 462 somewhat closer together to thereby firmly grip such containers.

The cap unthreading member 88 and the cap threading roll 92 provided at the inner side of the container supporting conveyor 54 are supported from a housing 530 shown in top plan in Figure 2 and, as best shown in Figure 12, supported between the inner portions of the crossbars 451 and 452. The unthreading roll 86 and outer threading roll 90 are supported from housing 532 which, as shown in Figure 11, is supported at the outer portion of the cross-bars 451 and 452. The driving mechanism within the two housings 530 and 532 is identical insofar as most parts are concerned. Therefore, identical parts are hereinafter described only with respect to inner housing 530 and such parts of outer housing 532 as are identical are given primed reference numerals.

As is shown in Figure 11, housing 532 is provided with a notch 534 in its left-hand face to fit the cross-bar 451 and the opposite wall of the housing is similarly notched to partially surround the central cross-bar 452.

Figure 10:
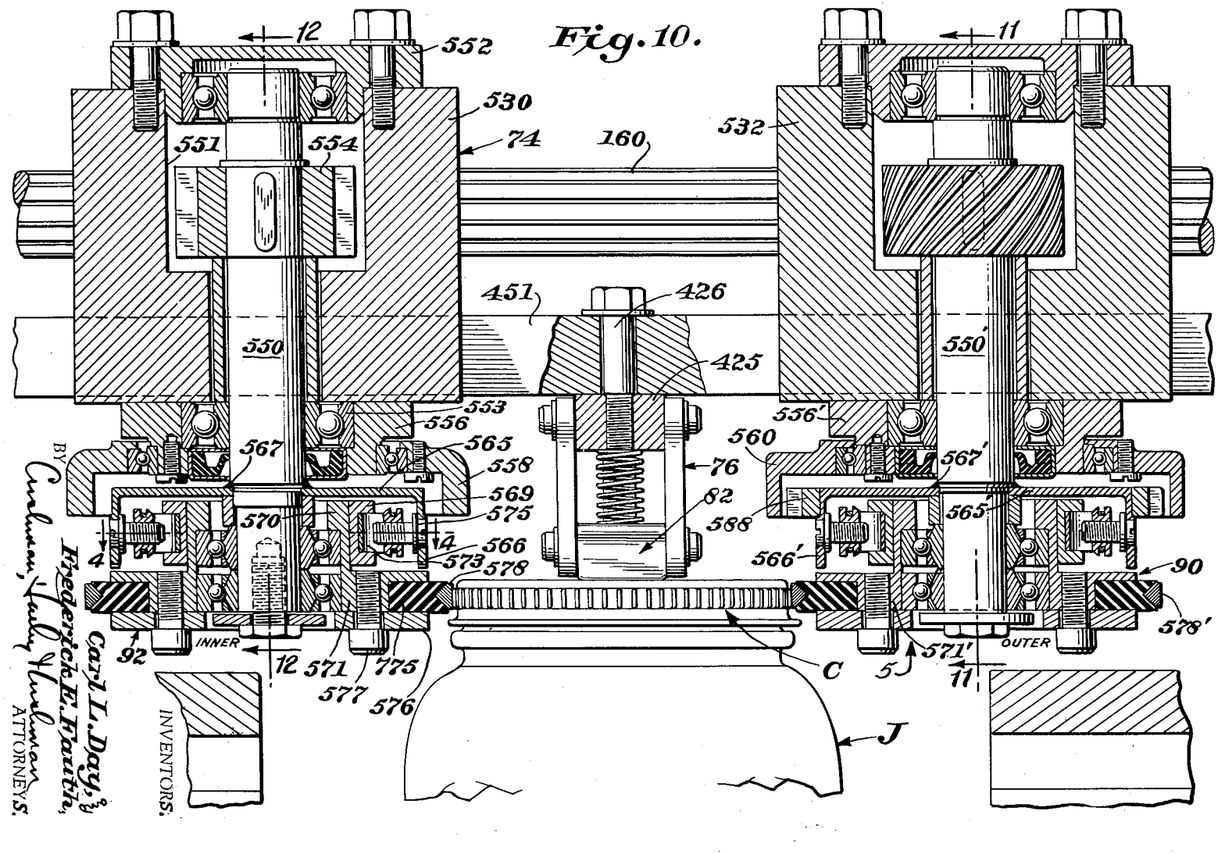
Figure 10 is a transverse vertical section of the cap securing mechanism, the figure showing the cap presser in vertical section on the line 10a—10a of Figure 15 and showing the threading rolls in vertical section on the line 10—10 of Figure 15.

A vertical shaft 550 is mounted within the chamber 551 of housing 530, the upper end of the shaft being journalled beneath a cap plate 552 and the lower end of the shaft extending from the bottom of the housing through a bearing 553. Adjacent its upper end shaft 550 has a spiral gear 554 fixed thereto which engages a gear 555 slidable upon but keyed to the splined shaft 160. As shown in Figure 10, the ball bearing 553 provided on shaft 550 immediately below the housing 530 has a collar 556 secured to its outer raceway to thereby serve as the pivot for a carrier member 558 which, as best shown in Figure 12, generally is of the form of a horizontally arranged plate extending toward the infeed end of the machine, the free end of the plate being stepped downwardly as indicated at 559 so that its free end lies in a lower plane. As is hereinafter described, the free portion of carrier element 558 supports the unthreading element 88. The carrier member 560 mounted on the shaft 550' of Figure 11 is not provided with a step such as 559 and, therefore, lies in a single plane.

Immediately beneath the carrier member 558, shaft 550 has a cup-shaped member 565 secured thereto, the flange 566 of the member projecting downwardly. Member 565 preferably is welded to shaft 550 as indicated at 567.

Figure 4:
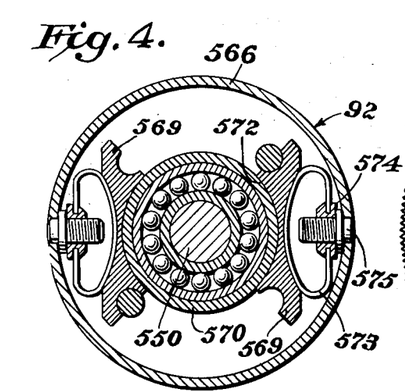
Figure 4 is a detail horizontal section of a cap threading roll on the line 4—4 of Figure 10.

As is best illustrated in Figure 4, the cup-shaped member 565 resiliently supports a pair of diametrically opposed friction shoes 569 so that the shoes will be urged into engagement with the upstanding sleeve 570 of a roller 571 freely journalled on the extreme lower end of shaft 550. Referring in more detail to the friction shoe mounting shown in Figure 4, it will be observed that each of the shoes 569 includes an arcuate inner face 572 to engage the sleeve 570 and the shoes are urged toward the sleeve by a bowed spring 573 supported in an annular groove surrounding an adjusting nut 574 threaded on a stud 575 rotatable in the skirt 566 of member 565. The outer ends of the studs 575 are slotted to receive the blade of a screw driver and the heads also are flanged inwardly of skirt 566 to be retained in place in skirt 566. By this arrangement, the tension of the bowed springs may be adjusted by rotating the studs from the exterior of the device.

Figure 5:
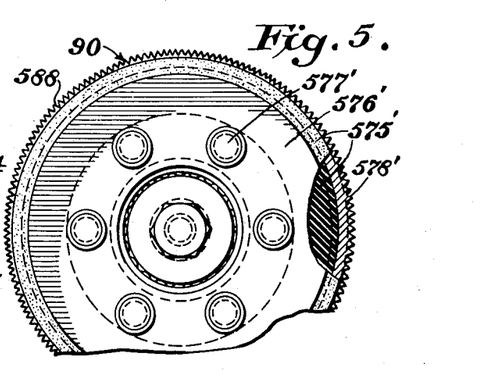
Figure 5 is a detail bottom plan of a cap threading roll, the figure showing the roll as viewed from the direction of the arrow 5 of Figure 10. A portion of the roll is shown in horizontal section.

Referring to Figure 10, the roller 571 is cut away at its lower periphery and includes a ring 775 of rubber or other suitable resilient but relatively rigid material. Ring 775 is retained in position by an annular plate 576 secured to roller 571 by machine screws 577. It will be observed that the rubber ring 775 is provided with a V-shaped groove in its periphery and in which a metal ring 578 is mounted. As indicated in Figure 5 with respect to ring 578' of roller 90, the outer periphery of the metal ring 578 is knurled. Ring 578 is held in the above-described position by the tendency of the rubber ring 775 to expand. The provision of the rubber ring gives a certain degree of resiliency to the mounting of the metal ring 578 but it is found that the use of a knurled metal element to engage the knurled surface on the caps is highly desirable.

It will be observed from Figure 10 that all of the parts in housing 530 which drive the inner threading element 92 are duplicated by corresponding parts mounted within the housing 532. As has been stated above, the corresponding parts in housing 532 are indicated by primed reference numerals. It also will be noted that by the arrangements described above, the inner threading element 92 and the outer threading element 90 are driven in a counterclockwise direction as diagrammatically indicated in Figure 15. In addition, the horizontally extending carrier elements 558 and 560 are rotatably mounted on the stationary elements 556 and 556', respectively, in such manner that the shaft axes serve as pivots for the carrier elements.

Referring to Figure 12 and as also shown in Figure 9, the carrier element 558 has a ring 580 secured to its lower face at its free end portion by means of a central collar 581, a compression limiting spacer 581a and a bolt 582 which latter extends through the element 558. Ring 580 is part of unthreading member 88, and its periphery is downwardly and inwardly tapered on an angle of about 45°. Ring 580 preferably is formed of rubber or other resilient material having frictional gripping qualities. Bolt 582 clamps ring 580 against turning, but if a portion of the ring periphery becomes worn, bolt 582 can be loosened so that ring 580 can be rotated to present a new surface.

Referring to Figures 9 and 11, the carrier element 560 mounted on the shaft 550' lies substantially in a single plane. A bolt 585 depending from the free end portion of plate 560 clamps the inner race of a roller bearing 586 and spacer 586a against plate 560 and this bearing in turn supports a gear ring 587, gear ring 587 meshing with a gear ring 588 which, as also illustrated in Figure 10, is secured to the outer upper portion of the cup-shaped member 565' fixed to shaft 550'. Machine screws 590 extending downwardly through gear ring 587 to a disc 591 clamp a ring 592 against the lower face of the gear ring 587. Spacer 591a limits the compression of ring 592. Ring 592, comprising part of unthreading roll 86, is of the same material and shape as the ring 580 which is rigidly mounted on carrier element 558 as part of unthreading member 88 and therefor is downwardly and inwardly tapered on an angle of approximately 45° to the vertical.

As is hereinafter described, it is desirable to urge the carrier plates 558 and 560 toward the center line of the conveyor 54 but to limit their movement in that direction.

Figure 6:
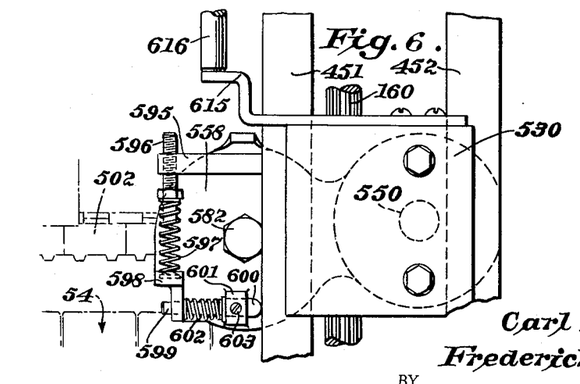
Figure 6 is a detail top plan of an unthreading roll tensioning device, the figure showing the roll as viewed from the direction of the arrow 6 of Figure 12.

The means for effecting this is illustrated in top plan in Figure 6, other showings of the means being included in Figures 11 and 12.

Referring to Figure 6, it will be borne in mind that the carrier element 558 is pivotally mounted about the shaft 550 indicated by dotted lines in the figure. A bar 595 projects from the frame 530 toward the infeed end of conveyor 54. At its outer end, bar 595 has a set screw 596 threaded therein, the set screw being mounted to extend parallel to crossbar 451. A spring 597 mounted on the inner end of set screw 596 extends to a socket in one face of a right-angled fittings 598, the other arm of fitting 598 being slidable upon a plunger 599 which has its other end headed as indicated at 600 and slidable through a lug 601 which extends upwardly from the carrier member 558. A spring 602 surrounds the plunger 599, one end of the spring bearing on the plunger head and the other end bearig on the fitting 598. Plunger 599 will be locked in adjusted position with respect to lug 601 by means of a set screw 603 threaded in the lug. By exerting pressure on fitting 598 mounted on plunger 599 locked to lug 601, spring 597 urges the carrier element 558 in a counterclockwise direction with respect to vertical shaft 550 and as viewed in Figure 6, but the position at which plunger 599 is locked in lug 601 to bear upon the cross-bar 451 will limit the inward movement of the carrier element produced by spring 597.

The carrier element 560 (Figure 11) pivotally mounted on the shaft 550' will include a tensioning arrangement such as illustrated in Figure 6 but with its parts reversed as indicated in Figure 9.

In order to enable the positioning of the threading members 90 and 92 to be adjusted with respect to the center line of the conveyor 54 and each other, and simultaneously to adjust the unthreading members 86 and 88, each of the housings 530 and 532 is threadedly engaged by oppositely threaded portions on a threaded shaft 610, which, as shown in Figures 2, 11 and 12, extends parallel to and between the cross-bars 451 and 452 of supporting frame 450. As appears in Figure 2, the outer end of shaft 610 is squared to receive an operating crank by means of which the shaft may be rotated.

In order to permit the threading and unthreading rolls readily to be positioned in properly spaced relationship for the handling of caps of various standard sizes, the following mechanism is provided: As shown in Figure 6 and in the left-hand central portion of Figure 2, the housing 530 has a plate 615 secured to its face which is adjacent the superstructure 100. Plate 615 is adapted to contact with the outer end of a plunger 616 which, as shown in Figure 2 is horizontally reciprocable in the superstructure 100. At its rearward end 617, plunger 616 is operatively connected to an arm 618 fixed to a hub 619 rotatable about a pin 620 which extends upwardly from the superstructure. Plunger 616 may be spring-urged toward plate 615. Hub 619 also has a relatively long pointer 621 extending therefrom which is movable along an arcuate indicia scale 622 mounted on the superstructure 100. The scale 622 will be provided with graduated markings corresponding to various standard sized caps. Therefore, when the operator wishes to adjust the position of the inner unthreading and threading members with respect to the outer members to handle caps of a certain size, the movement of the pointer 621 relative to the scale 622 may be observed to obtain the proper positioning.

As is best shown in Figure 7, but also is indicated in Figures 9 and 15, the presser device 76 is supported from the crossbars 451 and 452 of the supporting frame 450 and directly above the center line of the container supporting conveyor 54. In more detail, the presser device 76 comprises a top bar 625 extending longitudinally of the path of conveyor 54. Bar 625 has a bolt 626 extending upwardly therefrom through an aperture in crossbar 451 and a nut on the upper end of the bolt bears on the upper surface of crossbar 451 to clamp the bar 625 rigidly against the undersurface of crossbar 451. At its outfeed end, bar 625 is provided with an upwardly extending pin 627 which projects into a socket 628 opening upwardly from the lower surface of crossbar 452. Pin 627 thereby holds the bar 625 against sidewise movement.

Still referring to Figure 7, the infeed end of bar 625 is closely adjacent the cap applying device 58 and a presser member 80 is supported below this portion of bar 625. A second presser member 82 is supported below the outfeed end of bar 625. Presser member 80 is connected to bar 625 by two pairs of links 630 pivotally connected at their upper ends to bar 625 and pivotally connected at their lower ends to the presser member 80. All of the links 630 are of the same length and are so pivotally connected to bar 625 and presser member 80 that presser member 80 and its lower surface always will be parallel to bar 625 and the upper surface of the container supporting conveyor 54. Presser member 80 is urged downwardly to the position illustrated in Figure 7 by means of a coil spring 632 having its upper end fitted in a socket in bar 625 and its lower end fitted in a socket in the upper surface of presser member 80. The downward movement of presser member 80 is limited by means of a bolt 634 threaded in member 80 and extending upwardly through a longitudinally arranged slot 636 in bar 625, bolt 634 being provided with a nut and washer bearing on the upper surface of bar 625. The provision of slot 636 permits bolt 634 and presser member 80 to swing in a counterclockwise direction against the action of spring 632.

The undersurface of presser member 80 is flat and parallel to the surface of conveyor 54, and it will be noted from Figure 7 that member 80 extends from a point immediately adjacent the outfeed of cap applying element 58 to a point opposite the outfeed portion of the unthreading members 88 and 90. As is best shown in Figures 9 and 15, at its infeed end presser member 80 includes two forwardly extending lugs 640 which are horizontally apertured to support a pin 642 and three rolls comprising the roller device 78 are journalled on pin 642, the rolls being spaced by the lugs 640. It will be observed from Figure 7 that the rolls comprising the roller 78 are of such diameter that they project downwardly below the lower surface of presser 80 and also project forwardly beyond the lugs 640.

The second presser device 82 is connected to the bar 76 in the same manner as the presser device 80, the two devices being arranged in tandem. The spring 644 which urges presser device 82 downwardly is mounted at the infeed end of that device, and its infeed end is beveled as indicated at 644. The lower surfaces of the two devices 80 and 82 normally lie in the same horizontal plane though their downward limit position may be adjusted by adjustment of the bolt 634 of the device 80 and the bolt 646 of the device 82. The device 82 extends from a point closely adjacent the outfeed end of device 80 to a point opposite the outfeed end of the threading rollers 90 and 92. It will be observed from Figures 9 and 15 that the width of the presser devices 80 and 82 is only sufficient to permit them to bear on the central portion of a cap, but that the roller device 78 is of sufficient width to bear upon a substantial width of the cap. Because roller device 78 is formed of three independently rotatable rollers, these rollers may turn independently of each other, thereby decreasing frictional drag.

*Cap securing mechanism—Operation*

The operation of the cap securing device 74 is diagrammatically illustrated in Figure 15, though Figure 7 also is of interest. Assuming that a cap C is positioned in the lower end of the cap applying device 58 as indicated in dotted lines in Figure 7, the movement of a container with the container supporting conveyor 54 will bring the leading portion of the container mouth M into contact with the forward portion of the depending cap skirt S as indicated in Figure 7. The container moving to the right in Figure 7 will raise the cap skirt over the lugs 423 in the lower end of the cap applying device so that the cap may move forwardly with the container. At this instant, the top wall of the cap will come into engagement with the roller device 78 which will tend to urge the cap downwardly upon the container mouth as it is withdrawn from device 58. The spring pressed retainer plate 424 also will assist in this action.

When the cap has been entirely withdrawn from the cap applying device 58 to thereby be in the substantially horizontal position indicated at position B in Figure 15, the cap will loosely rest upon the container mouth, except that it will be under the control of the presser 80. The matter of how far downwardly upon the container mouth the cap is seated at this moment primarily will depend upon whether the lugs L of the cap are resting upon the threads T as shown in position D1 of Figure 8, or whether the lugs L have happened to drop downwardly between the container threads. In the embodiment of the invention illustrated herein, the caps are provided with four inwardly projecting lugs L equidistantly spaced about their skirts and the container mouth is provided with four threads, two diametrically opposite threads being of the form shown at T in Figure 8, that is, bayonet-slot or closed at one end, and the other two being of the open ended form indicated at T' in Figure 8. Obviously, if the lugs L of the cap happen to land upon the threads T and T', the cap will be in the relatively raised position with respect to the container mouth indicated in Figure 8. In containers of this type, the total length of the upwardly facing surfaces of the four threads will comprise about two-thirds of the diameter of the container mouth. Hence, the probabilities are that the lugs will rest upon the threads, rather than fall between the threads.

It may be that when the cap is at position B of Figure 15, a lug L may rest upon the extreme upper edge of the container mouth M. So long as the cap is beneath the roller 78, the downward pressure of spring 632 of Figure 7 will exert downward pressure upon the cap to tend to correct this positioning. However, as soon as the cap moves clear of the roller 78, that is, to the position indicated as position D in Figure 15, the spring 632 will immediately urge presser device 80 downwardly with a sharp action to thereby cause the presser device 80 to apply a smart tap or impact to the top wall of the cap. This usually will serve to free a lug from the top edge of the container mouth M and cause the cap to assume a level position.

If a cap has its lugs L resting on the threads T and T' as indicated at position D1 in Figure 8 so that the cap is somewhat raised with respect to the container, when the continued forward movement of conveyor 54 brings the cap between the unthreading members 88 and 86, the upper portion of the cap skirt will firmly contact with those unthreading members. As is indicated in Figure 15, member 88 is stationary, but member 86 is being driven from shaft 550' to rotate in such directions as to move the cap in an unthreading direction with respect to the container. This position of the cap and unthreading members is illustrated at position E in Figure 15. Roller 86 normally will be driven at such speed that the portion of its periphery which engages the cap C will have with a peripheral velocity twice the velocity of the container supporting conveyor 54 and gripping chain 84. This fact, taken with the fact that member 88 is stationary, will cause the cap C to be rotated in an unthreading direction as the container and cap move with the conveyor 54. Therefore, the cap lugs L will be moved from the position indicated at position D1 in Figure 8 to the position indicated at position E1 so that the lugs thereby are clear of the threads. With the presser device 80 acting downwardly upon the top wall of the cap, as soon as the lugs reach position E1, they will move downwardly to position E2 of Figure 8, that is, will be pressed down between the threads. This downward movement of the cap with respect to the tapered unthreading members 86 and 88 will move the cap periphery downwardly and out of contact with the tapered unthreading members so that the unthreading rotation of the cap will cease.

It will be observed from the foregoing that the provision of downwardly and outwardly tapered unthreading devices in conjunction with the spring-pressed presser device 80 assures that a cap only will be rotated in an unthreading direction sufficiently to move its lugs L to a position where they can move downwardly between the container threads. Because of the above-stated relative velocities of the conveyor 54 and roller 86, the cap C and container J will remain in axial alignment during unthreading movement of the cap.

As has been indicated above, if a cap happens to be so positioned upon a container mouth that its lugs will lie between the threads as indicated at position E2 in Figure 8, such a cap probably will not contact with the unthreading members 86 and 88.

As has been explained above, the unthreading members 86 and 88 are mounted adjacent the free ends of the carrier member 558 and 560 which are pivoted about the axes of the shafts 550 and 550'. The springs 597 of Figure 6 urge the members 86 and 88 toward each other and the limit plungers 600 will be so adjusted that a cap which is in the raised position relative to the container shown in solid lines in Figure 11 will be firmly engaged by the unthreading members.

When the continued forward movement of conveyor 54 brings the cap C to position F illustrated in Figure 15, the metal rings 578 and 578' of the constantly rotating threading rollers 90 and 92 will engage the knurling on the cap skirt as shown in Figure 10. At this time, the cap will be under downward pressure exerted by the pressure device 82. The rollers 90 and 92 are rotated in such direction as to impart a threading movement to the cap, the angular rotation being the same as that of the unthreading roller 86. The engagement of the threading rollers 90 and 92 with the cap will cause it to be rotated to move the cap lugs from the position indicated at position E2 of Figure 2 to the relation with the container threads shown in position F1 of that figure. In other words, the lugs L will be moved in a threading direction beneath the downwardly inclined threads T and T' of the container. When the threading movement has brought the usual rubber sealing ring of the cap into firm contact with the lip M of the container mouth, the lugs will be so firmly engaged beneath the threads that further threading rotation of the cap will be prevented. When this occurs, the cap threading rolls 90 and 92 also may stop rotation by reason of the friction clutch devices 569 by means of which they are connected to their driving shafts 550 and 550'. Therefore, the container will not be unduly twisted relative to the chains 84 nor the cap excessively threaded upon the container, but a firm seal will be obtained.

The continued forward movement of conveyor 54 then will carry the container and cap to the position free of the presser member 82 and the threading rollers indicated at the extreme right in Figure 15. As there indicated, the container will still be engaged by the gripping chains or belts 84 until the cap is entirely free of presser 82 and the threading rollers.

If the container headspace has been filled with steam from the tunnel 55, and if a steam atmosphere exists adjacent the cap securing mechanism 74 by reason of the steam moving from the tunnel 55 and the diffuser 56 no air can move into the container headspace during the cap applying and securing operations. However, as the container moves onward to the right in Figure 15 to a cooler atmosphere, the steam will condense, thereby further assisting in holding the top wall of the cap and the sealing gasket firmly against the cap mouth.

Figures 16, 17, 19:
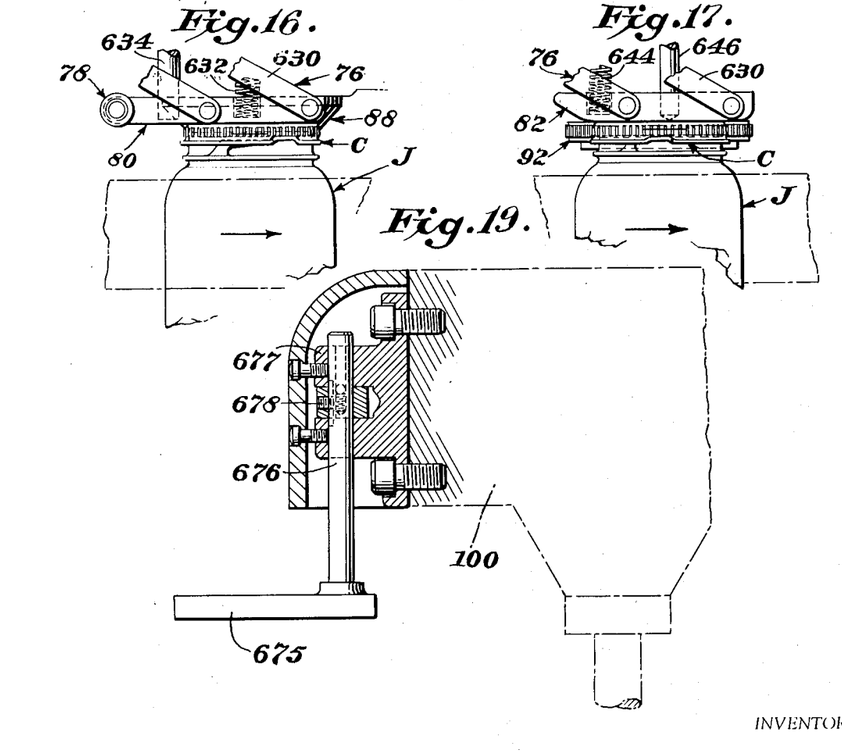
Figures 16 and 17 are fragmentary detail views illustrating how the successive portions of the cap presser and unthreading members and threading rolls position a cap with respect to a container.
Figure 19 is a fragmentary vertical section on the line 19—19 of Figure 2.

In order to properly adjust the cap applying device 58 and cap securing mechanism 74 for a desired height of container, the superstructure 100 includes the gauging device 675 illustrated in Figure 19. Device 675 includes a vertical rod 676 rotatably mounted in horizontally extending lugs 677 projecting forwardly from the superstructure 100. The gauge is of plate-like form so that it may lie parallel to the mouth of the container. Gauge 675 is secured at a predetermined height by means of set screw 678 but may be rotatable with respect to the lugs. In normal operation of the machine, plate 675 will be swung inward of the path of containers moving with conveyor 54.

As is indicated in Figures 2 and 3, device 675 is positioned adjacent the outfeed end of the superstructure 100 and above the conveyor 54. When the apparatus is to be operated to handle containers of a certain size, with the conveyor 54 stationary, a container C may be placed upon the conveyor 54 adjacent the gauging device 675. The motor 98 then may be operated to bring the gauging device 675 to the plane of the top edge of the lip M of the container mouth. With the gauge 675 in this position, all of the cap applying and securing elements will be in the proper horizontal plane for caps applied to containers of that height.

It will be understood that suitable guide bars may be provided above and adjacent conveyor 54 to hold containers centered thereon.

As has been indicated above, the container operated switch arm 68 illustrated in Figure 3 as extending along tunnel 55 controls the operation of the cap feeding motor (not shown) which drives hopper impeller blades (not shown) and disc 64. It will be observed from Figure 3 that arm 68 is pivoted in a housing 680 secured to the work table 52, and the arm is of such length that a single container will hold it outwardly during the time that the container is moving a substantial distance within tunnel 55. Therefore, so long as containers are moving toward cap applying device 58 reasonably spaced apart, arm 68 will be held outwardly and motor 66 will drive the cap feeding elements. However, if no container engages arm 68, it will swing inwardly by spring pressure to the position shown in Figure 3, and the cap feeding motor (not shown) will cease operation. The motor 96 obviously will continue to operate conveyor 54 and the cap securing mechanism 74. Guide bars, not shown, will hold containers upright while they engage switch arm 68.

The provision of the container controlled switch 68 for the cap feeding motor (not shown) will avoid over-feeding of caps to chute 60 and the undue stirring of caps in hopper 62 which otherwise would occur during delays in the feeding of containers.

The subject matter disclosed in the drawings and description in this application but not claimed herein may be claimed in our divisional application Serial No. 405,195, filed January 20, 1954, and entitled "Cap Feeding and Applying Mechanism" or in our divisional application Serial No. 405,194, filed January 20, 1954, and entitled "Method and Apparatus for Sealing Containers."

It will be perceived that the apparatus described above fulfills all of the objects described in the opening portion hereof.

The terminology used in the specification is for the purpose of description and not of limitation, the scope of the invention being indicated in the claims.

We claim:

1. In a mechanism to secure a cap element provided with threaded-type engaging means to a threaded-type mouth container element, means to move the container element and a loosely applied cap element in a predetermined path, means in said path to engage the peripheral portion of the cap element to cause that element to turn in unthreading direction with respect to the container element as the two elements move along said path, said means including a member provided with a cap engaging surface which is downwardly inclined away from the cap axis, and means beyond said unthreading means to engage one of the elements to turn it in threading direction with respect to the other element.

2. A mechanism of the character described in claim 1 wherein said member is rotatable.

3. A mechanism of the character described in claim 1 wherein said unthreading member and said means to thread the element are rotatable.

4. A mechanism of the character described in claim 1 wherein said unthreading member and said means to thread the element are rotatable, and means to drive said member and threading means.

5. A mechanism of the character described in claim 1 wherein said means to thread an element engages the cap element.

6. A mechanism of the character described in claim 1 including means to urge said cap and container elements axially toward each other.

7. A mechanism of the character described in claim 1 wherein said unthreading means includes two members, one on each side of said path, and each provided with a cap engaging surface which is downwardly inclined away from the cap axis, one of the members being rotatable and the other being non-rotatable.

8. A mechanism of the character described in claim 1 including a stationary cap-engaging means on the opposite side of the path of movement of the cap element from said means to turn the cap element in unthreading direction, and wherein the velocity of movement of said container element moving means has a ratio with respect to the velocity of the cap engaging periphery of said means to turn the cap element in unthreading direction of one to two to thereby maintain the cap and container elements in axial alignment.

9. In a mechanism to secure a cap element provided with threaded-type engaging means to a threaded-type mouth container element, means to move the container element and a loosely applied cap element in a predetermined path, means in said path to engage the peripheral portion of the cap element to cause that element to turn in unthreading direction with respect to the container element as the two elements move along said path, a member adjacent said last-named means to engage the cap element top to urge the cap element downwardly, and means beyond said unthreading means to engage one of the elements to turn it in threading direction with respect to the other element.

10. A mechanism of the character described in claim 9 wherein said member to engage the cap element top is downwardly spring-urged.

11. A mechanism of the character described in claim 9 wherein said member to engage the cap element top comprises a bar, means to support said bar above and parallel to said predetermined path, spring means to urge said bar downwardly, said bar including a downward projection adjacent its infeed end arranged to bear upon a cap element during initial movement of the latter in said predetermined path.

12. A mechanism of the character described in claim 9 wherein said member to engage the cap element top is a cap actuated impact member.

13. In a mechanism to secure a cap provided with threaded-type engaging means to a threaded-type container mouth, a supporting frame, a container supporting conveyor beneath said frame to move in a straight line containers having caps loosely applied thereto, a pair of cap engaging rollers journaled on said frame on opposite sides of said conveyor to engage opposite sides of a container-carried cap, a pair of cap engaging members supported by said frame on opposite sides of said conveyor and at the infeed side of said rollers, one of said cap engaging members being stationary and arranged to be engaged by one side of a cap, the other of said cap engaging members being rotatable, means to drive said cap engaging rollers in cap threading direction and to rotate said rotatable cap engaging member in cap unthreading direction.

14. A mechanism of the character described in claim 13 including means supported by said frame between said members to urge caps downwardly upon containers.

15. A mechanism of the character described in claim 13 wherein each of said cap engaging rollers includes a resiliently mounted cap engaging ring formed of rigid material.

16. A mechanism of the character described in claim 13 wherein each of said cap engaging members is downwardly inclined away from the cap axis.

17. A mechanism of the character described in claim 13 wherein each of said cap engaging members is downwardly inclined away from the cap axis, and includes a resilient container engaging portion.

18. A mechanism of the character described in claim 13 wherein said means to drive said rollers and cap engaging member includes a direct drive between one of said rollers and said rotatable member.

19. A mechanism of the character described in claim 13 including horizontally extending carriers pivoted adjacent one end upon the axes of said cap engaging rollers, and wherein said cap engaging members are mounted on said carriers.

20. A mechanism of the character described in claim 13 including horizontally extending carriers pivoted adjacent one end upon the axes of said cap engaging rollers, said cap engaging members are mounted on said carriers, means to urge the member carrying portions of said carriers toward each other, and means to limit such movement of the carriers.

21. A mechanism of the character described in claim 13 including means supported on said frame between said cap engaging rollers and members to urge caps downwardly upon the containers.

22. A mechanism of the character described in claim 13 including means to simultaneously adjust the cap engaging roller and member on one side of said conveyor with respect to the roller and member at the other side of said conveyor.

23. A mechanism of the character described in claim 13 including means movable with said conveyor to grip containers.

24. A mechanism of the character described in claim 13 wherein the means to drive said cap engaging rollers includes an overload disengageable clutch.

25. In mechanism to secure a cap provided with threaded-type engaging means to a threaded-type container mouth, a supporting frame, a container supporting conveyor to move in a straight line containers having caps loosely applied thereto, a pair of vertical shafts journaled on said frame, one at each side of said conveyor, means to rotate said shafts in like direction, a pair of horizontally arranged carrier elements respectively journaled on said shafts and each including a free end extending toward the infeed end of said conveyor, a pair of cup-like members, one fixed to each of said shafts, a rotor journaled on each of said shafts within the corresponding cup-like member, a friction clutch connection between each cup-like member and the corresponding rotor, a pair of cap threading rolls, one fixed to each of said rotors, a pair of downwardly and inwardly tapered cap unthreading members respectively carried at the infeed ends of said carrier elements, one of said unthreading members being fixed to its carrier element, the other unthreading member being journaled on its carrier element, a driving connection between said last-mentioned unthreading member and the cup-like member which is on the same side of the conveyor, means to urge the free ends of said carrier elements toward the conveyor, means to limit such movement, and downwardly urged means supported on said frame above said conveyor and between said carrier elements to urge caps downwardly upon the containers.

26. A mechanism of the character described in claim 25 wherein said downwardly urged means comprises a bar fixed to said supporting frame between said carrier elements to extend longitudinally of and above said conveyor, a pair of presser members arranged in tandem beneath said bar and including horizontal lower surfaces, a series of links pivotally connecting said presser members for vertical movement relative to said bar and to maintain the presser members parallel to the surface of said conveyor, means to urge said presser members downwardly, and a cap engaging roller pivotally mounted at the infeed end of the forward presser member, the periphery of said roller projecting below the lower surface of the bar, said roller being positioned in advance of said unthreading members.

27. A mechanism of the character described in claim 25 including means to vertically adjust said supporting frame and the elements carried thereby relative to said conveyor.

28. In a mechanism to secure a cap provided with threaded-type engaging means to a threaded-type container mouth, rotatable means to engage the cap including a peripheral cap-engaging ring formed of rigid material, a rotary driving shaft positioned centrally of said ring, and a resilient member movable with said shaft and supporting said ring.

References Cited in the file of this patent

UNITED STATES PATENTS

| | | |
|---|---|---|
| 962,030 | Kirkegaard | June 21, 1910 |
| 1,445,296 | Clark | Feb. 13, 1923 |
| 1,664,514 | Kramer | Apr. 3, 1928 |
| 1,669,726 | Seale | May 15, 1928 |
| 2,312,114 | Mills | Feb. 23, 1943 |
| 2,317,470 | Marx | Apr. 27, 1943 |
| 2,435,127 | Cameron | Jan. 27, 1948 |
| 2,439,773 | Hohl et al. | Apr. 13, 1948 |